US007802584B2

(12) United States Patent
Ricco et al.

(10) Patent No.: US 7,802,584 B2
(45) Date of Patent: Sep. 28, 2010

(54) FUEL INJECTOR FOR INTERNAL COMBUSTION ENGINE AND CORRESPONDING METHOD OF MANUFACTURE

(75) Inventors: Mario Ricco, Casamassima (IT); Adriano Gorgoglione, Valenzano (IT); Raffaele Ricco, Valenzano (IT); Sergio Stucchi, Valenzano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 944 days.

(21) Appl. No.: 11/646,747

(22) Filed: Dec. 27, 2006

(65) Prior Publication Data

US 2007/0289578 A1 Dec. 20, 2007

(30) Foreign Application Priority Data

Jun. 15, 2006 (EP) .................................. 06425404

(51) Int. Cl.
*F16K 31/02* (2006.01)
*F02M 51/06* (2006.01)

(52) U.S. Cl. .............................. 137/15.18; 137/315.03; 251/126.16; 239/585.3; 29/890.09; 29/890.127

(58) Field of Classification Search ............ 137/315.03, 137/15.17, 15.18; 251/129.21, 129.16; 239/585.1, 239/585.3; 29/890.09, 890.127
See application file for complete search history.

(56) References Cited

U.S. PATENT DOCUMENTS 6,834,667 B2 * 12/2004 Sumiya et al. ......... 137/315.03
7,407,119 B2 * 8/2008 Czimmek ................ 239/585.1
7,497,391 B2 * 3/2009 Reiter ................... 251/129.21
2003/0141475 A1 7/2003 Ruthardt et al.

FOREIGN PATENT DOCUMENTS

| | | |
|---|---|---|
| DE | 10138930 | 10/2002 |
| DE | 10240880 | 3/2004 |
| EP | 0571003 | 11/1988 |
| EP | 1106816 | 6/2001 |
| EP | 1193391 | 4/2002 |
| WO | WO-0250424 | 6/2002 |
| WO | WO-2005119046 | 12/2005 |

* cited by examiner

*Primary Examiner*—Kevin L Lee
(74) *Attorney, Agent, or Firm*—RatnerPrestia

(57) ABSTRACT

A fuel injector comprising a hollow body for housing a metering valve with a calibrated pipe for outlet of the fuel from a control chamber. The calibrated pipe is normally kept closed by a shutter controlled by an electromagnet comprising a magnetic core and an electric coil housed in an annular slot of the core. The coil outer cylindrical surface forms a gap with the annular slot so as to be lapped by the fuel coming out of the calibrated pipe. The coil comprises a bobbin having a pair of appendages for supporting electric supply plugs, which are englobed at least in part in a block of non-magnetic material. The bobbin has a substantially cylindrical rib, one flange adjacent to an end portion of the plugs, and another flange having a smaller diameter that forms a passage for the fuel between the calibrated pipe and the gap.

35 Claims, 3 Drawing Sheets

FUEL INJECTOR FOR INTERNAL COMBUSTION ENGINE AND CORRESPONDING METHOD OF MANUFACTURE

CROSS REFERENCE TO RELATED APPLICATIONS

This application claims priority to European Patent Application No.: 06425404.8 filed Jun. 15, 2006, incorporated herein by reference.

BACKGROUND OF THE INVENTION

The present invention relates to a fuel injector for an internal-combustion engine, and the corresponding method of manufacture.

Injectors are known in which the bobbin of the coil carries a pair of hollow appendages, inserted in which are the two plugs, which are rendered fixed with the coil, for example by means of a block or disk made of non-magnetic material. This block is relatively costly to manufacture, both with regard to the mechanical machining and with regard to its assembly.

In a known injector, in which the two plugs are parallel to the axis of the core, it has been proposed to englobe in a block made of non-magnetic plastic material both the core and a portion of the plugs, which hence constitute inserts in the injector for moulding of the block itself. In such an injector, the bobbin has an outer diameter such as to define, in the annular slot of the core, a passage for the plastic material, which at the moment of injection in the mould totally coats the coil. This injector presents the drawback of preventing dissipation of the heat produced by the coil, following upon excitation of the electromagnet. In fact, the coil is completely coated by the plastic material, which reduces substantially the heat-exchange capacity thereof with the environment, in particular its capacity for transmitting the heat produced to the diesel fuel, which flows through the magnetic core to be subsequently disposed of.

SUMMARY OF THE INVENTION

The invention relates to a fuel injector and a corresponding method of manufacture that will contain cost and that will eliminate the drawbacks of the electromagnetic injectors of the known art.

In particular, the invention regards an injector comprising a hollow body in which is housed a metering valve for fuel injection, the valve having a calibrated pipe for outlet of the fuel from a control chamber. The pipe is normally kept closed by a shutter controlled by an electromagnet comprising a magnetic core and an electric coil that is housed in an annular slot of the core.

Normally, the electromagnet is fixed in the hollow body with the interposition of a block made of non-magnetic material, by means of a proper fixing system, which pushes the core against a fixed shoulder of such hollow body, for example a ring nut screwed on the hollow body. The electric coil is formed by a series of turns electrically connected to two supply plugs. The turns are wound on a supporting bobbin, provided with two equal flanges, which have internal and external diameters that are the same as one another and the same as those of the annular slot.

BRIEF DESCRIPTION OF THE DRAWINGS

For a better understanding of the invention, some preferred embodiments are described herein, purely by way of example with the aid of the annexed plate of drawings.

DETAILED DESCRIPTION OF THE INVENTION

Figure 1:
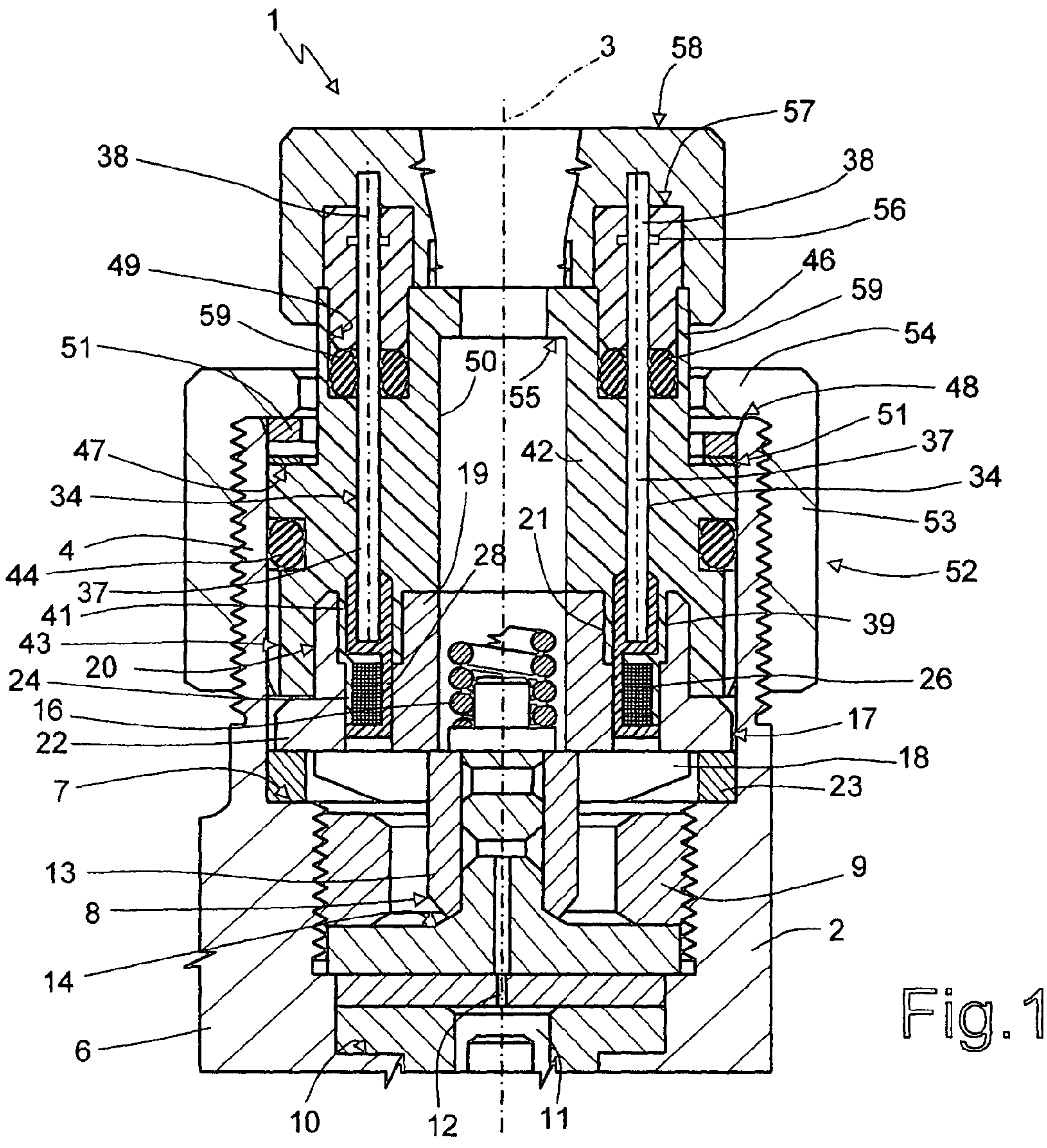
FIG. 1 is a partial diametral section of a fuel injector according to a first embodiment of the invention.

FIG. 1 illustrates a fuel injector for an internal-combustion engine, which comprises a casing formed by a hollow body 2 having a tubular shape with axis 3. Starting from the top free end, the hollow body 2 comprises two tubular stretches 4 and 6, having internal diameters decreasing and radiused by an internal shoulder 7 orthogonal to the axis 3. The tubular stretch 6 houses a metering valve 8 for the injection, which, via a ring nut 9, is blocked against a shoulder 10 of the tubular stretch 6.

The metering valve 8 comprises a control chamber 11 having a calibrated pipe 12 for outlet of the fuel under pressure from such control chamber 11. The calibrated pipe 12 is normally kept closed by a shutter 13, which is pushed against a contrast surface 14 by a helical compression spring 16, which will be described more clearly hereinafter. The calibrated pipe 12 is opened by the antagonistic action exerted by an actuator, formed by an electromagnet 17, which acts on a disk-shaped armature 18, fixed to the shutter 13. The electromagnet 17 and the armature 18 are housed in the tubular stretch 4 of the hollow body 2.

Figure 3:
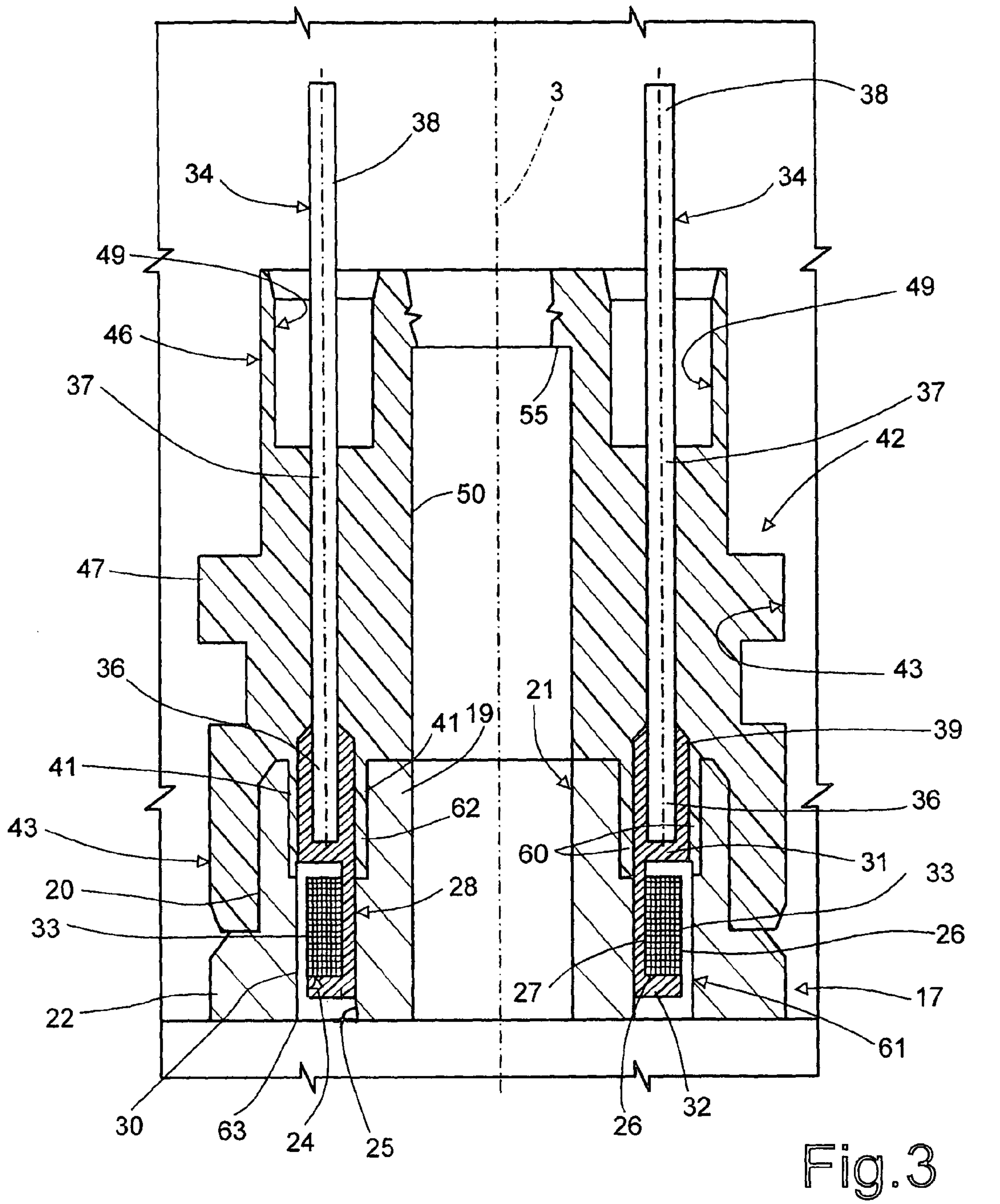
FIG. 3 is the partial diametral section of the fuel injector embodiment of FIG. 1, at an enlarged scale, with some parts removed.

The electromagnet 17 comprises a magnetic core 19 with a toroidal shape, having an axial through slot 21, housed in which is the spring 16. The core 19 comprises a cylindrical part 20 and a flange 22, with which it bears upon the shoulder 7, through a spacer ring 23. The core 19 moreover has an annular slot 24, designed to house an electric coil 26. The annular slot 24 (FIG. 3) has an inner cylindrical surface 25 and an outer cylindrical surface 30.

Figure 2:
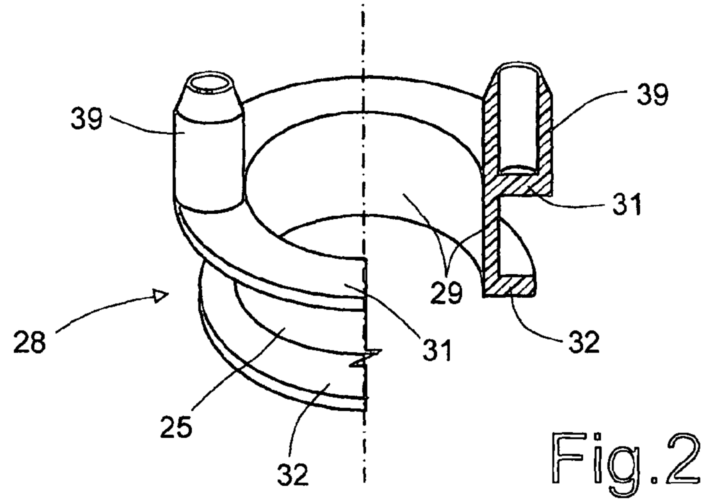
FIG. 2 is a partially sectioned perspective view of the exemplary fuel injector bobbin shown in FIG. 1.

The coil 26 is formed by a series of turns 27 wound around a bobbin 28 (see also FIG. 2) made of insulating plastic material, having a C-shaped cross section. In particular, the bobbin 28 is formed by a cylindrical rib 29 having an internal diameter that is substantially the same as the diameter of the inner cylindrical surface 25 of the slot 24, and two plane flanges 31 and 32. The turns 27 are set so as to define an outer surface 33 of the coil 26, which is substantially cylindrical.

The electromagnet 17 further comprises two plugs 34 for electrical supply of the coil 26, which are parallel to the axis 3 and are set transversely at a distance from one another. Each plug 34 has a first end portion 36, electrically connected, in a known way, to a corresponding terminal of the coil 26. Each plug 34 further comprises a central portion 37, and a second end portion 38 projecting, in use, beyond the tubular stretch 4 (FIG. 1) of the hollow body 2. The first end portion 36 is inserted into a corresponding appendage 39 (FIGS. 2 and 3) shaped like a bushing, which is made of a single piece with the flange 32 of the bobbin 28. Preferably, the two appendages 39 are diametrically opposite to one another, and each is inserted into a corresponding through hole 41 made in the annular slot 24 of the core 19.

The electromagnet 17 further comprises a monolithic block 42 made of non-magnetic plastic material, embedded in which are the cylindrical part 20 of the core 19, and the intermediate portions 37 of the plugs 34. Preferably, the non-magnetic material may be a polyamide reinforced with fibre glass, for example ZYTEL® or STANYL® plastic resins. In particular, the block 42 has a first portion 43 that englobes the cylindrical part 20 of the core 19 and rests against the flange 22 of the core 19. The portion 43 has an outer diameter which approximates by defect the inner diameter of the tubular stretch 4 (see also FIG. 1), with which it is coupled via interposition of a gas seal 44.

The block 42 comprises also a second portion 46 having an outer diameter smaller than that of the portion 43, to which it is radiused via an annular shoulder 47 orthogonal to the axis 3. The portion 46 projects on the outside of the tubular stretch 4, and the shoulder 47 is set at a distance from a top end edge 48 of said stretch 4 by a pre-set amount. The portion 46 has two blind axial cavities 49, each set in a position corresponding to the portion 38 of the corresponding plugs 34. The block 42 further comprises a through central slot 50, which forms with the slot 21 of the core a discharge pipe for the fuel coming out of the calibrated pipe 12. The slot 50 houses a part of the spring 16 and has a shoulder 55 bearing upon which is the spring 16 itself.

The shoulder 47 of the block 42 defines a resting surface for a compression spring 51, conveniently of the Belleville-washer or crinkle-washer type, which is forced against such shoulder 47 by a ring nut 52 shaped like a cup turned upside down. In particular, the ring nut 52 has an internally threaded side wall 53, which is screwed on an outer threading of the tubular stretch 4. The ring nut 52 moreover has an annular end wall 54, which surrounds with radial play the portion 46 of the block 42, and is set, in use, bearing upon the top edge 48 of the tubular stretch 4. The annular wall 54 defines an axial contrast surface for the spring 51.

The end portion 38 of each plug 34 is designed to be coupled electrically to a respective terminal 56. The two terminals 56 are carried by two corresponding terminal blocks 57 housed in an electrical-insulation cap or lid 58. In use, the end portion 38 of each plug 34 projects from the corresponding blind axial cavity 49 of the block 42, fitted around such end portion 38 is a gas seal 59. Then, fitted on the portions 38 of the plugs 34 are the two terminal blocks 57, and the lid 58 is fitted on the tubular stretch 4 of the hollow body 2.

In a preferred embodiment, the coil 26 is formed in such a way that its outer surface 33 is lapped by the fuel that comes out of the calibrated pipe 12. In particular, the outer surface 33 of the coil 26 forms, with the outer surface 30 of the annular slot 24, a gap 61, which said fuel enters.

According to the embodiment of FIGS. 1-4, the holes 41 of the core 19 each have a diameter larger than that of the outer surface of the corresponding appendage 39, so that another gap 62 is formed. During injection of the plastic material to form the block 42, integrally formed therewith in each gap 62 is a bushing 60, which englobes the corresponding appendage 39. Such non-magnetic material does not penetrate into the gap 61, however, so that the surface 33 of the coil 26 remains exposed. In particular, according to the variant of FIGS. 1-3, the flange 32 of the bobbin 28 has an outer diameter conveniently smaller than that of the outer surface 30 of the annular slot 24 so that it forms an annular passage 63 for the fuel that is to lap the surface 33 of the coil 26.

Figure 7:
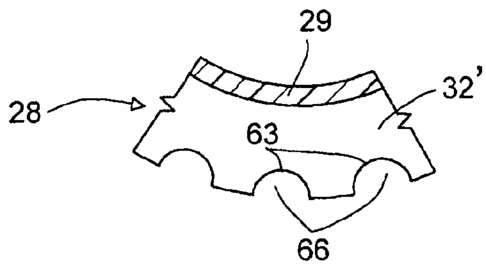
FIG. 7 is a section of a portion of an exemplary bobbin flange, taken according to the line VII-VII of FIGS. 4 and 6.
Figure 4:
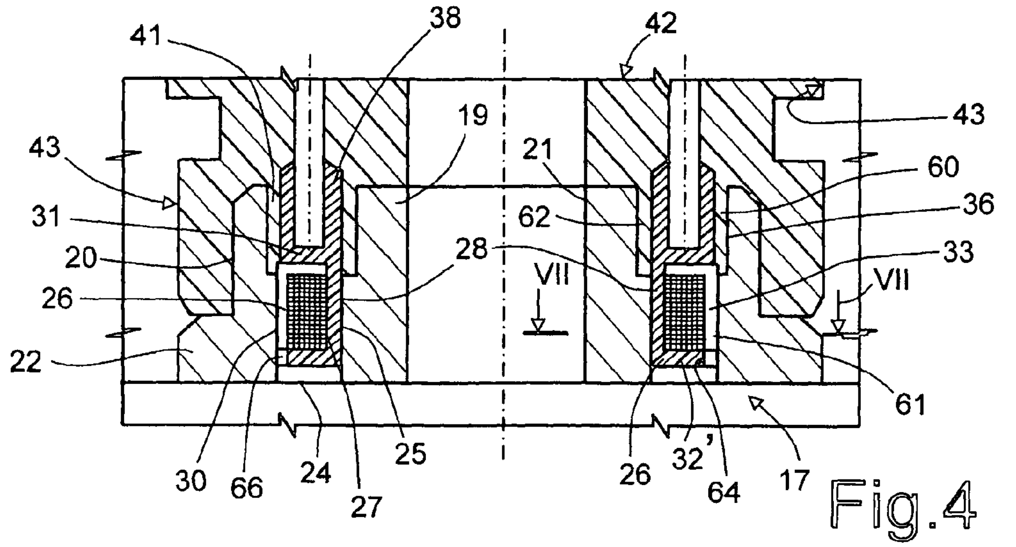
FIG. 4 is a portion of the partial diametral section with parts removed similar to the view shown in FIG. 3, showing another exemplary fuel injector embodiment.

In the variant illustrated in FIG. 4, the flange 32' of the bobbin 28 has a diameter that is substantially the same as that of the top flange 31 and of the outer surface 30 of the annular slot 24. The flange 32' is provided with at least two recesses 64 (in FIG. 7 a series of recesses), however, forming as many passages 66 for the fuel that is to lap the surface 33 of the coil 26.

Figure 5:
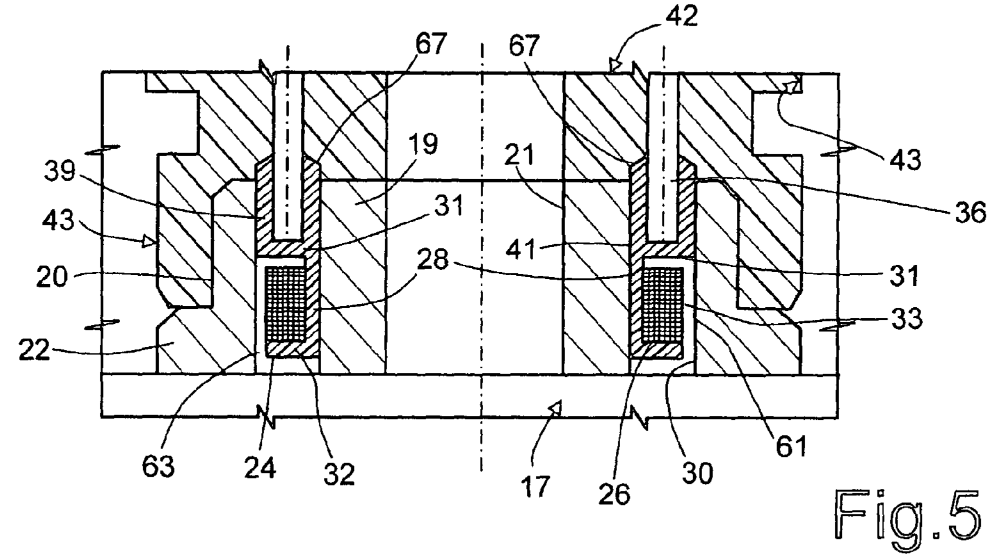
FIG. 5 is a portion of the partial diametral section with parts removed similar to the view shown in FIG. 4, showing yet another exemplary fuel injector embodiment.
Figure 6:
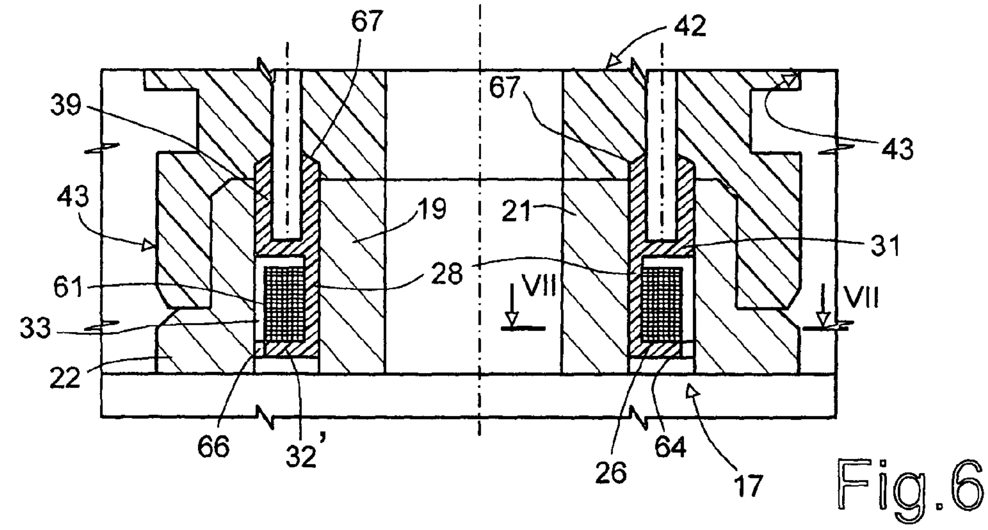
FIG. 6 a portion of the partial diametral section with parts removed similar to the view shown in FIGS. 4 and 5, showing still another exemplary fuel injector embodiment.

According to the embodiment of FIGS. 5 and 6, the holes 41 of the core 19 have a diameter that is substantially the same as the outer diameter of the appendages 39 of the bobbin 28, which are force fitted into the holes 41. The non-magnetic material of the block 42 now englobes only a portion 67 of the appendages 39 that projects from the core 19. In the variant of FIG. 5, the flange 32 of the bobbin 28 has a diameter smaller than that of the outer annular surface 30, so forming an annular passage 63 for the fuel, as in the case of FIG. 3. In the variant of the embodiment of FIG. 5, illustrated in FIGS. 6 and 7, the flange 32' has a series of recesses 64, thus forming a series of passages 66, as in the case of FIG. 4.

The injector 1 can be manufactured using a method of manufacture that includes injection of the non-magnetic material of the block 42 into a mould, in which the core 19 and the coil 26 will already be present, so as to englobe the cylindrical part 20 of the core 19, the central part 37 of the plugs 34 and at least the projecting part 67 of the appendages 39 of the bobbin 28. This method of manufacture comprises the following steps:

- providing the bobbin 28 for a coil 26 having a C-shaped section, and having two appendages 39 each designed to house a first end portion 36 of a corresponding plug 34;
- winding the turns 27 of the coil 26 on the bobbin 28 and inserting into each appendage 39 the first end portion 36 of the corresponding plug 34;
- inserting into the core 19 the bobbin 28 with the coil 26 and the plugs 34;
- providing a mould to form a block 42 made of non-magnetic material such as to englobe at least part of the core 19, of the appendages 39 of the bobbin 28, and of the plugs 34;
- providing in the mould the core 19 with the bobbin 28 and the plugs 34;
- providing in the mould a core such as to form a gap 61 between an outer surface 33 of the coil 26 and an annular slot 24 of the core 19;
- injecting the non-magnetic plastic material into said mould; and
- separating the block 42 of non-magnetic material thus formed from said core and said mould.

Next, the following further steps are carried out:

- coupling a compression spring 51 to the block 42;
- inserting the block 42 thus coupled into a tubular stretch 4 of the hollow body 2 of the injector 1; and
- locking the block 42 in said tubular stretch 4 with a ring nut 52 through the compression spring 51.

From what has been seen above the advantages of the injector 1 and of the corresponding method of manufacture according to the invention as compared to the known art are evident. In particular, the fuel coming out of the calibrated pipe 12, by constantly lapping the outer surface 33 of the coil 26, rapidly dissipates the heat produced by the passage of current in its turns 27, so that the working life of the injector 1 is increased. In addition, the method of manufacture enables the passages 63, 66 for the fuel towards the gap 61 between the coil 26 and the annular slot 24 to be easily obtained, and assembly of the various components of the injector 1 to be simplified.

It is understood that various modifications and improvements may be made to the fuel injector and to the corresponding method of manufacture described above, without thereby departing from the scope of the claims. For example, the block 42 of non-magnetic material can assume different shapes, or else be replaced with two or more parts that will enable fixing of the plugs 34 to the core 19 and fixing of the latter in the tubular stretch 4 of the hollow body 2.

What is claimed:

1. A fuel injector for an internal-combustion engine comprising a hollow body;

a metering valve housed within the hollow body and having a calibrated pipe for outlet of fuel from a control chamber;

a shutter, controlled by an electromagnet, for keeping the calibrated pipe normally closed, the electromagnet comprising a magnetic core having an annular slot;

an electric coil carried by a bobbin, housed in the annular slot, and comprising a substantially cylindrical outer surface, said bobbin having a C-shaped section defined by a substantially cylindrical rib interposed between two flanges substantially planar and parallel to one another;

a pair of a appendages mounted on one of said bobbin flanges each appendage supporting a first end of one of a pair of plugs for connection to an electrical supply; said appendages inserted into two corresponding holes in said magnetic core and defining corresponding gaps between the holes and the appendages; and a block of non-magnetic material englobing said magnetic core and at least a portion of said plugs, said block comprising a pair of bushings that fit within said corresponding gaps to englobe at least a portion of said appendages projecting from said holes;

wherein said block and said annular slot define a space that permits fuel exiting the control chamber to contact the outer surface of said electrical coil.

2. The injector of claim 1, wherein one of said flanges has a smaller diameter than the other flange on which said appendages are mounted, forming an annular passage for said outflowing fuel.

3. The injector of claim 1, wherein at least one of said flanges has at least two perimetral recesses that form corresponding passages for said outflowing fuel.

4. The injector of claim 2, wherein said core and said block have corresponding central slots in communication with said space for discharging fuel coming out of said calibrated pipe.

5. The injector of claim 3, wherein said core and said block are formed with corresponding central slots in communication with said space for discharging fuel coming out of said calibrated pipe.

6. The injector of claim 1, wherein each of said appendages has an outer surface adhered to a surface of said corresponding hole so that said block englobes only said part of said appendages.

7. The injector of claim 4, wherein each of said appendages has an outer surface adhered to a surface of said corresponding hole, so that said block englobes only said part of said appendages.

8. The injector of claim 1, wherein said block comprises two parallel cylindrical cavities, each cavity positioned to correspond to a second end portion of one of the plugs, each of said plugs has having a respective seal set between said second end portion and the corresponding parallel cavity of said block.

9. The injector of claim 6, wherein said block comprises two parallel cylindrical cavities, each cavity positioned to correspond to a second end portion of one of the plugs, each of said plugs having a respective seal set between said second end portion and the corresponding parallel cavity of said block.

10. The injector of claim 7, wherein said block comprises two parallel cylindrical cavities, each cavity positioned to correspond to a second end portion of one of the plugs, each of said plugs having a respective seal set between said second end portion and the corresponding parallel cavity of said block.

11. The injector of claim 1, wherein said block is connected to said hollow body by a ring nut screwed on said hollow body, and a compression spring is configured between said ring nut and said hollow body.

12. The injector of claim 2, wherein said block is connected to said hollow body by a ring nut screwed on said hollow body, and a compression spring is configured between said ring nut and said hollow body.

13. The injector of claim 3, wherein said block is connected to said hollow body by a ring nut screwed on said hollow body, and a compression spring is configured between said ring nut and said hollow body.

14. The injector of claim 4, wherein said block is connected to said hollow body by a ring nut screwed on said hollow body, and a compression spring is configured between said ring nut and said hollow body.

15. The injector of claim 5, wherein said block is connected to said hollow body by a ring nut screwed on said hollow body, and a compression spring is configured between said ring nut and said hollow body.

16. The injector of claim 6, wherein said block is connected to said hollow body by a ring nut screwed on said hollow body, and a compression spring is configured between said ring nut and said hollow body.

17. The injector of claim 7, wherein said block is connected to said hollow body by a ring nut screwed on said hollow body, and a compression spring is configured between said ring nut and said hollow body.

18. The injector of claim 8, wherein said block is connected to said hollow body by a ring nut screwed on said hollow body, and a compression spring is configured between said ring nut and said hollow body.

19. The injector of claim 9, wherein said block is connected to said hollow body by a ring nut screwed on said hollow body, and a compression spring is configured between said ring nut and said hollow body.

20. The injector of claim 10, wherein said block is connected to said hollow body by a ring nut screwed on said hollow body, and a compression spring is configured between said ring nut and said hollow body.

21. The injector of claim 5, wherein each of said appendages has an outer surface adhered to a surface of said corresponding hole, so that said block englobes only said part of said appendages.

22. The injector of claim 21, wherein said block comprises two parallel cylindrical cavities, each cavity positioned to correspond to a second end portion of one of the plugs, each of said plugs having a respective seal set between said second end portion and the corresponding parallel cavity of said block.

23. The injector of claim 21, wherein said block is connected to said hollow body by a ring nut screwed on said hollow body, and a compression spring is configured between said ring nut and said hollow body.

24. The injector according to claim 22, wherein said block is connected to said hollow body by a ring nut screwed on said hollow body, and a compression spring is configured between said ring nut and said hollow body.

25. The injector of claim 2, wherein each of said appendages has an outer surface adhered to a surface of said corresponding hole, so that said block englobes only said part of said appendages.

26. The injector of claim 3, wherein each of said appendages has an outer surface adhered to a surface of said corresponding hole, so that said block englobes only said part of said appendages.

27. The injector of claim 2, wherein said block comprises two parallel cylindrical cavities, each cavity positioned to correspond to a second end portion of one of the corresponding plugs, each of said plugs having a respective seal set between said second end portion and the corresponding parallel cavity of said block.

28. The injector of claim 3, wherein said block comprises two parallel cylindrical cavities, each cavity positioned to correspond to a second end portion of one of the corresponding plugs, each of said plugs having a respective seal set between said second end portion and the corresponding parallel cavity of said block.

29. The injector of claim 25, wherein said block comprises two parallel cylindrical cavities, each cavity positioned to correspond to a second end portion of one of the corresponding plugs, each of said plugs having a respective seal set between said second end portion and the corresponding parallel cavity of said block.

30. The injector of claim 26, wherein said block comprises two parallel cylindrical cavities, each cavity positioned to correspond to a second end portion of one of the corresponding plugs, each of said plugs having a respective seal set between said second end portion and the corresponding parallel cavity of said block.

31. A method for manufacture of a fuel injector of claim 1, the method comprising the steps of:

(a) providing the bobbin for said coil;

(b) winding said coil on said bobbin and inserting a first end portion of one of said plugs into each of said appendages;

(c) inserting said bobbin into said core with said coil and said plugs;

(d) providing a mold to form said block of non-magnetic material;

(e) inserting said core into said mold with said bobbin and said plugs;

(f) injecting a non-magnetic plastic material into said mold; and (g) separating said block thus formed from said core and from said mold.

32. A method for manufacture of a fuel injector for an internal-combustion engine, having a hollow body in which an electromagnet is housed for controlling a metering valve for the injection, the electromagnet comprising a magnetic core, an electric coil and two plugs electrically connected to said coil, said core having an annular slot for housing said coil, and two holes for the passage of said plugs, the method comprising the steps of:

(a) providing a bobbin for said coil having a C-shaped section, said bobbin having two appendages, each designed to receive a first end portion of the corresponding plug;

(b) winding said coil on said bobbin and inserting the first end portion of the corresponding plug into each appendage;

(c) inserting said bobbin into said core with said coil and said plugs;

(d) providing a mould to form a block of non-magnetic material to englobe at least part of said core, said appendages of the bobbin, and said plugs;

(e) providing said core in said mould with said bobbin said plugs;

(f) providing a core in said mould to form a gap between an outer surface of said coil and said annular slot;

(g) injecting a non-magnetic plastic material into said mould; and (h) separating said block thus formed from said core and from said mould.

33. The method of claim 32, wherein the method further comprises the steps of:

(i) coupling said block with a compression spring;

(j) inserting said coupled block into a tubular stretch of said hollow body; and (k) locking said block and said compression spring in said tubular stretch with a ring nut.

34. A fuel injector for an internal-combustion engine, the fuel injector comprising:

a hollow body;

an electromagnet housed in the hollow body for controlling a metering valve, the electromagnet comprising a magnetic core, an electric coil wound on a bobbin, and two plugs electrically connected to said coil, said core having an annular slot for housing said coil and two holes for receiving said plugs, the bobbin having a C-shaped section and two appendages, each appendage supporting a first end portion of one of said two plugs;

said bobbin, said coil, and said plugs inserted within said core, defining a gap between an outer surface of said coil and said annular slot in said core; and a block of non-magnetic, plastic material englobing at least a portion of said core, said bobbin appendages, and said plugs.

35. The fuel injector of claim 34 further comprising said block housed within a tubular stretch of said hollow body, a compression spring coupled to said block, and a ring nut locking said block and said compression spring in said tubular stretch.

* * * * *